(12) United States Patent
Tsai et al.

(10) Patent No.: US 9,268,143 B2
(45) Date of Patent: Feb. 23, 2016

(54) IMAGE REARRANGING LENS AND PROJECTION APPARATUS

(71) Applicants: Chih-Hsien Tsai, Hsinchu (TW); Wei-Hung Tsai, Hsinchu (TW); Hung-Chih Chou, Hsinchu (TW)

(72) Inventors: Chih-Hsien Tsai, Hsinchu (TW); Wei-Hung Tsai, Hsinchu (TW); Hung-Chih Chou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 129 days.

(21) Appl. No.: 14/140,477

(22) Filed: Dec. 25, 2013

(65) Prior Publication Data

US 2014/0198302 A1 Jul. 17, 2014

(30) Foreign Application Priority Data

Jan. 14, 2013 (CN) .......................... 2013 1 0012585

(51) Int. Cl.
*G03B 21/20* (2006.01)
*G02B 27/10* (2006.01)
*G02B 27/12* (2006.01)
*H04N 13/04* (2006.01)

(52) U.S. Cl.
CPC .......... *G02B 27/106* (2013.01); *G02B 27/1066* (2013.01); *G02B 27/123* (2013.01); *H04N 13/0459* (2013.01)

(58) Field of Classification Search
CPC .......... H04N 13/0434; H04N 13/0459; H04N 9/3197; G03B 21/28
USPC ........ 353/7, 30, 37, 38, 94, 98, 102; 359/242, 359/245, 462, 264, 751; 348/743–747, 758
See application file for complete search history.

(56) References Cited

U.S. PATENT DOCUMENTS

| | | | |
|---|---|---|---|
| 6,220,714 B1 * | 4/2001 | Eguchi .......................... | 353/122 |
| 6,795,241 B1 * | 9/2004 | Holzbach ....................... | 359/463 |
| 7,213,920 B2 * | 5/2007 | Matsui et al. ................... | 353/20 |
| 7,832,874 B2 | 11/2010 | Ikeda et al. | |
| 2004/0263793 A1 * | 12/2004 | Kim et al. ....................... | 353/33 |
| 2009/0185138 A1 * | 7/2009 | Kubara ............. | G02B 27/2214 353/8 |
| 2010/0232039 A1 | 9/2010 | Chen et al. | |
| 2015/0215609 A1 * | 7/2015 | Huang ................. | H04N 13/045 353/30 |

FOREIGN PATENT DOCUMENTS

| | | |
|---|---|---|
| CN | 1254101 | 5/2000 |
| CN | 1344953 | 4/2002 |
| CN | 1975498 | 6/2007 |
| CN | 101923205 | 12/2010 |
| TW | 201219850 | 5/2012 |

OTHER PUBLICATIONS

"Office Action of China Counterpart Application", issued on Sep. 6, 2015, p1-p7, in which the listed references were cited.

\* cited by examiner

*Primary Examiner* — Sultan Chowdhury
(74) *Attorney, Agent, or Firm* — Jianq Chyun IP Office

(57) ABSTRACT

An image rearranging lens and a projection apparatus are provided. The image rearranging lens is used to rearrange a plurality of sub images provided by an image source and arranged along an arranging direction. The image rearranging lens includes a plurality of lens groups arranged along the arranging direction. Each of the sub images is imaged on a corresponding lens group. Optical axes of the lens groups are not aligned to each other along the arranging direction. The optical axis of each of the lens groups and the optical axis of the neighboring lens groups have an offset along a direction perpendicular to the arranging direction.

20 Claims, 6 Drawing Sheets

IMAGE REARRANGING LENS AND PROJECTION APPARATUS

CROSS-REFERENCE TO RELATED APPLICATION

This application claims the priority benefit of China application serial no. 201310012585.4, filed on Jan. 14, 2013. The entirety of the above-mentioned patent application is hereby incorporated by reference herein and made a part of this specification.

BACKGROUND

1. Technical Field

The invention relates to a lens and a projection apparatus. Particularly, the invention relates to a lens and a projection apparatus capable of rearranging images.

2. Related Art

A conventional projection apparatus is to use a projection lens to project an image from a light valve to a screen. Generally, an aspect ratio of the image projected according to such method is complied with an aspect ratio of the image on the light valve. Therefore, when the projection lens is about to project a long strip image, the image on the light valve is also required to have a shape of the long strip. In this way, some area of an active region of the light valve cannot be used. Moreover, a resolution of the long strip image projected through such method is not high.

Taiwan Patent Publication No. 201219850 discloses a multi-image display device including a symmetric prism array, an image processing unit, a control unit and an image display unit. The symmetric prism array may respectively project different images onto two screens. Moreover, U.S. Pat. No. 7,832,874 discloses a first optical system and a second optical system configured in a display rack. The first optical system guides a part of an image projected by a projector to the back of a screen, and the second optical system guides another part of the image projected by the projector to a load space.

SUMMARY

The invention is directed to an image rearranging lens, which is capable of rearranging a plurality of sub images arranged along an arranging direction.

The invention is directed to a projection apparatus, which is capable of rearranging a plurality of sub images arranged along an arranging direction.

Other objects and advantages of the invention can be further illustrated by the technical features broadly embodied and described as follows.

In order to achieve one or a portion of or all of the objects or other objects, an embodiment of the invention provides an image rearranging lens. The image rearranging lens is used to rearrange a plurality of sub images provided by an image source and arranged along an arranging direction. The image rearranging lens includes a plurality of lens groups arranged along the arranging direction. Each of the sub images is imaged on a corresponding lens group. Optical axes of the lens groups are not aligned to each other along the arranging direction. The optical axis of each of the lens groups and the optical axis of the neighboring lens groups have an offset along a direction perpendicular to the arranging direction.

An embodiment of the invention provides a projection apparatus. The projection apparatus includes an image source used for providing images and the aforementioned image rearranging lens. The image rearranging lens is disposed on a transmission path of an image beam.

According to the above descriptions, the image rearranging lens and the projection apparatus of the invention may guide the sub image beams to different directions based on a design that the optical axes of the lens groups are not aligned along the arranging direction of the sub images, so as to rearrange the sub images.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
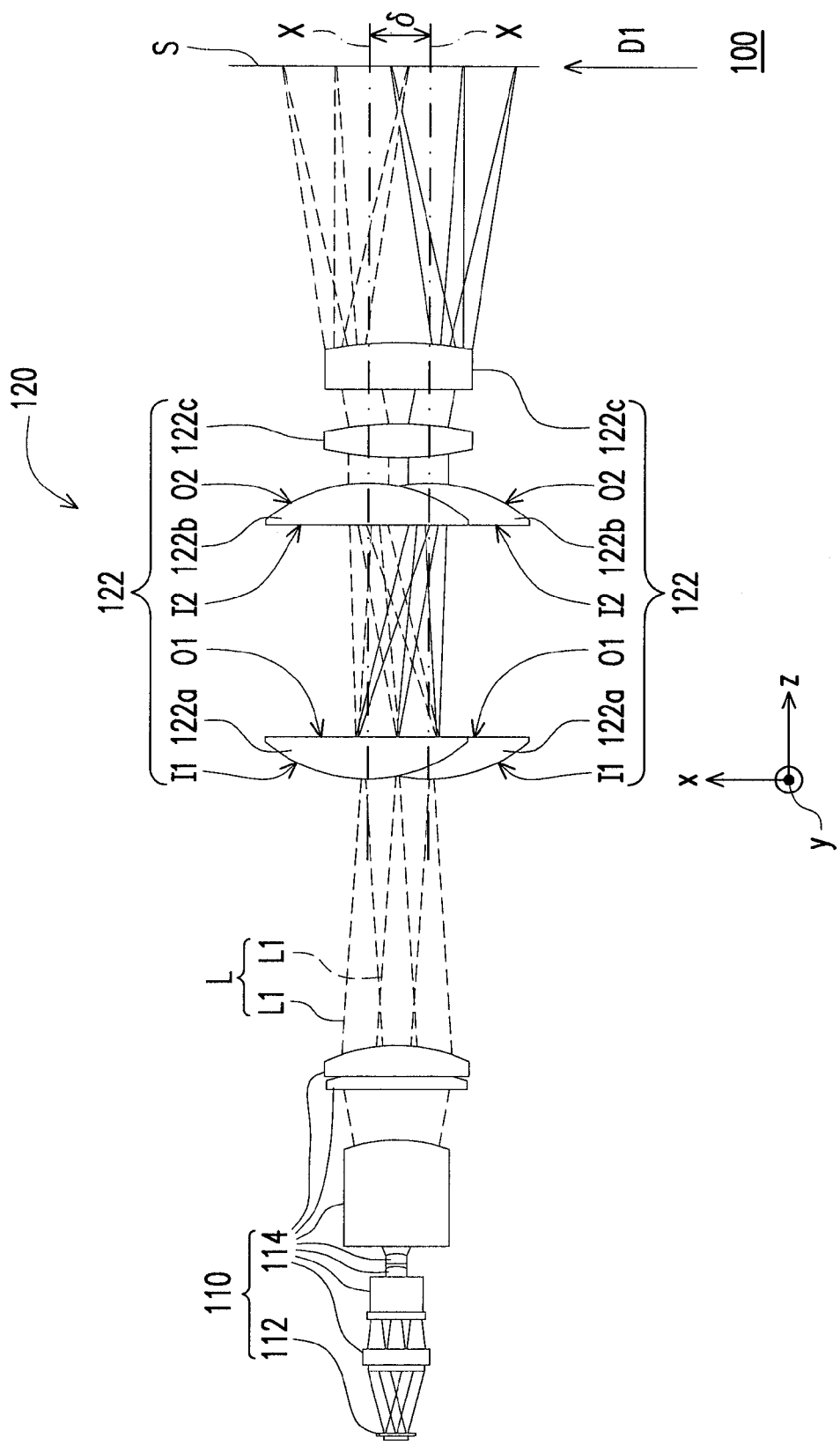
FIG. 1 is a top view of a projection apparatus according to an embodiment of the invention.
Figure 2:
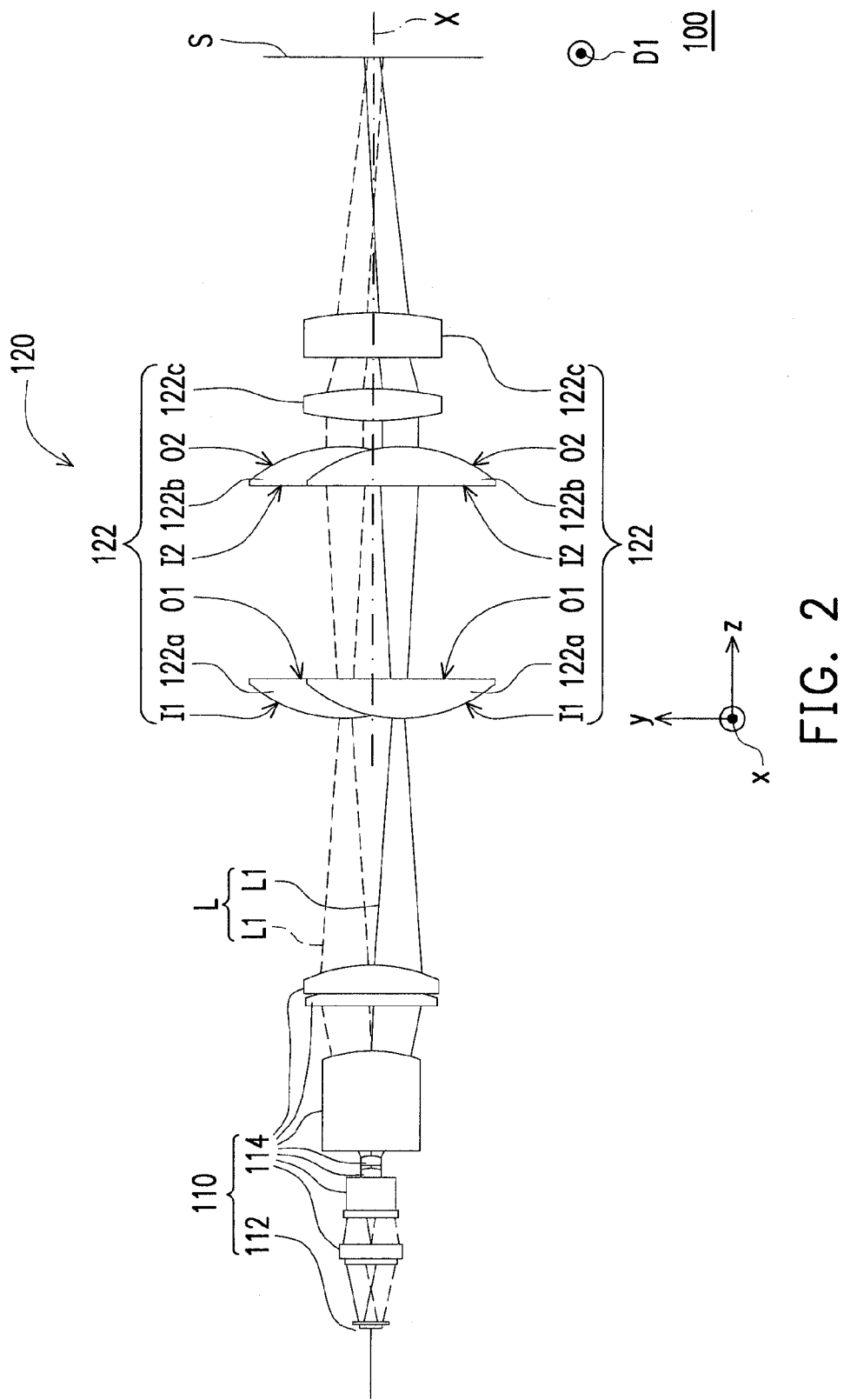
FIG. 2 is a side view of the projection apparatus of FIG. 1.
Figure 3:
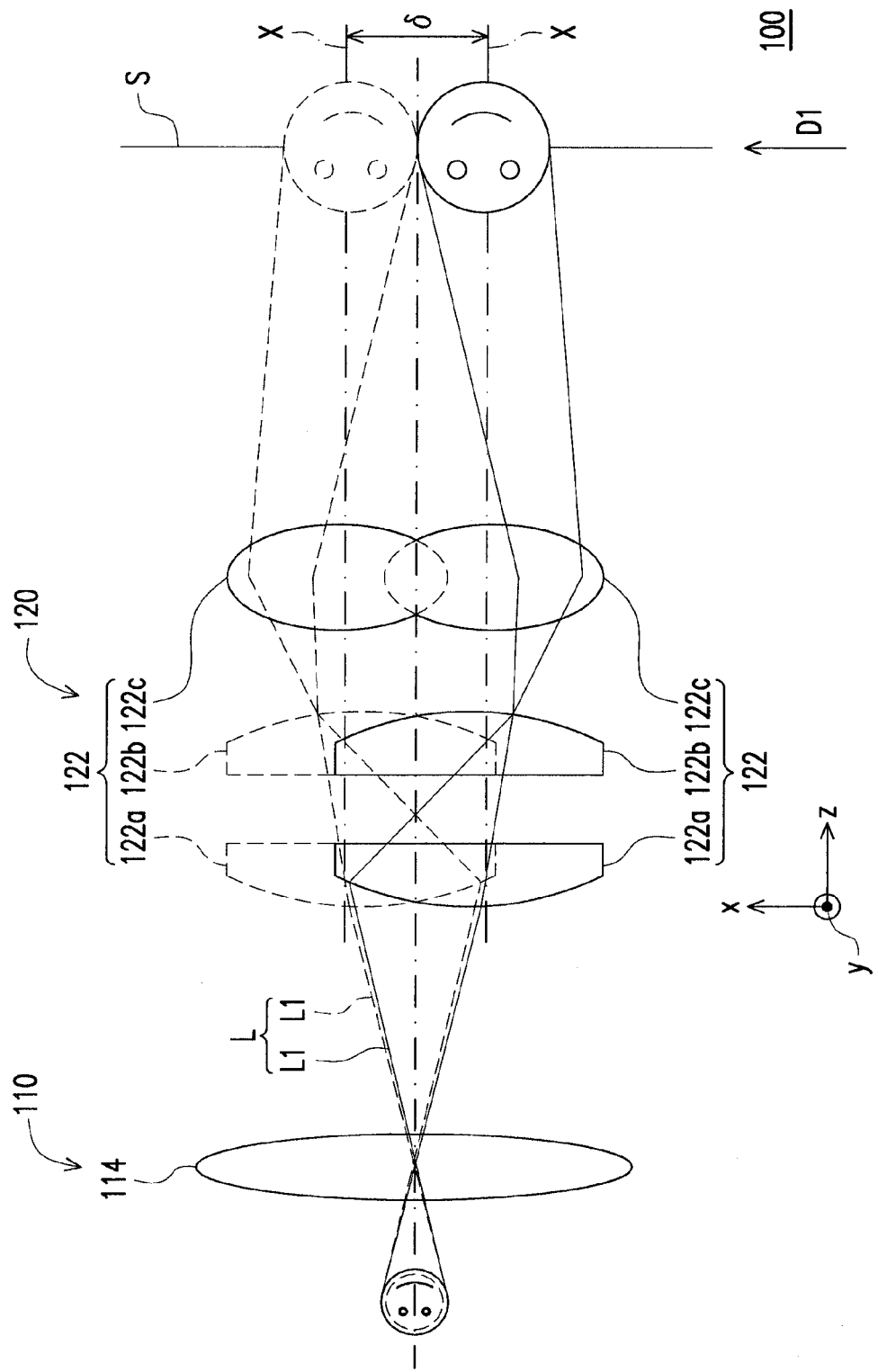
FIG. 3 illustrates an image optical path in the projection apparatus of FIG. 1.

FIG. 1 is a top view of a projection apparatus according to an embodiment of the invention. FIG. 2 is a side view of the projection apparatus of FIG. 1. FIG. 3 illustrates an image optical path in the projection apparatus of FIG. 1. For clarity's sake, in FIG. 3, one lens is used to represent a projection lens of FIG. 1, and a plurality of smiley faces are used to represent images provided by an image source of FIG. 1. Referring to FIG. 1, FIG. 2 and FIG. 3, the projection apparatus 100 of the embodiment includes an image source 110 used for providing an image beam L and an image rearranging lens 120 located on a transmission path of the image beam L. In the embodiment, the image source 110 is, for example, a projection unit, and the projection unit includes a light source (not shown) used for emitting an illumination beam (not shown), a light valve 112 used for converting the illumination beam into the image beam L, and a projection lens 114 used for projecting the image beam L. However, the image source of the invention is not limited to be generated through the light valve 112 of the projection unit. In other embodiments, the image source can also be a display panel or other types of image sources.

In the embodiment, the image source 110 divides the image beam L into a plurality of sub image beams L1 arranged along an arranging direction y, and the image rearranging lens 120 is used to rearrange the sub image beams L1 provided by the image source 110.

Figure 4:
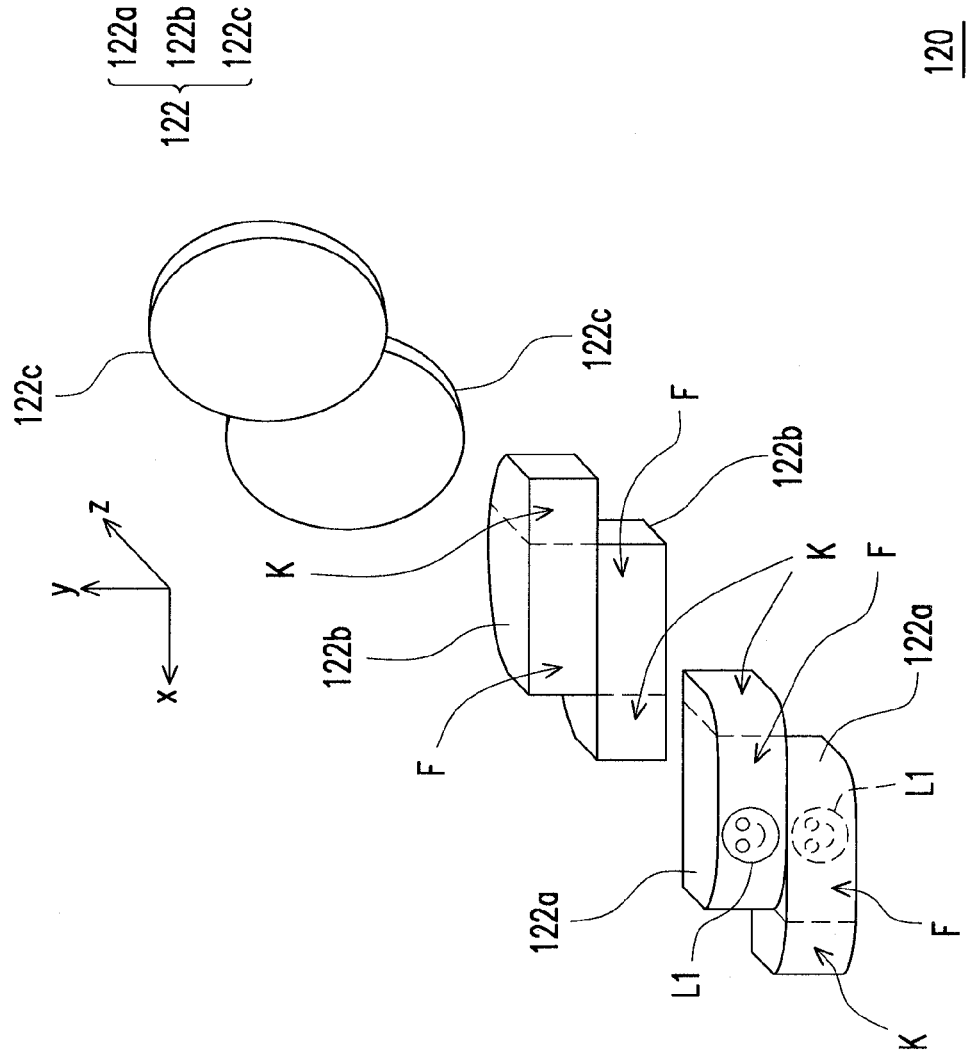
FIG. 4 is a three-dimensional view of an image rearranging lens according to an embodiment of the invention.

FIG. 4 is a three-dimensional view of the image rearranging lens according to an embodiment of the invention. Referring to FIG. 1, FIG. 2, FIG. 3 and FIG. 4, the image rearranging lens 120 includes a plurality of lens groups 122 arranged along the arranging direction y. Each of the sub image beams L1 is imaged on a corresponding lens group 122. In detail, as shown in FIG. 4, each of the lens groups 122 has an imaging portion F and a shifting portion K connected to the imaging portion F. One of the sub image beams L1 is imaged on the imaging portion F of the corresponding lens group 122, and is not imaged on the shifting portion K.

Referring to FIG. 1, FIG. 2 and FIG. 3, it should be noticed that optical axes X of the lens groups 122 are not aligned to each other along the arranging direction y, and the optical axis X of each of the lens groups 122 and the optical axis X of the neighboring lens group 122 have an offset δ along a direction x perpendicular to the arranging direction y. Since the optical axes of the lens groups 122 are not aligned to each other along the arranging direction y of the sub image beams L1, the lens groups 122 may guide the sub image beams L1 to different directions, so as to rearrange the sub images L1 on a screen S.

In an embodiment of the invention, the image rearranging lens 120 can rearrange the sub image beams L1 arranged along the arranging direction y into the sub image beams L1 arranged along a direction D1 perpendicular to the arranging direction y. Further, through a suitable optical design, the image rearranging lens 120 can further connect the sub image beams L1 to construct a new image.

For example, the sub image beams L1 can respectively carry local landscape patterns of different regions, and the sub image beams L1 can be rearranged and connected through the image rearranging lens 120 to form a long strip panoramic image. However, the method that the image rearranging lens rearranges the sub images is not limited as that described above, and by suitably designing a shifting direction and an offset between the optical axes X of the lens groups 122, the sub image beams L1 can be rearranged through other method.

In the embodiment, the image rearranging lens 120 is disposed between the projection lens 114 and the screen S, and each of the lens groups 122 of the image rearranging lens 120 includes a first lens 122a and a second lens 122b. The first lens 122a and the second lens 122b are disposed on a transmission path of the corresponding sub image beam L1. The first lens 122a is located between the image source 110 and the second lens 122b. The first lens 122a has a first light incident surface I1 and a first light emergent surface O1. The second lens 122b has a second light incident surface I2 and a second light emitting surface O2. In the embodiment, the first light incident surface I1 can be a convex surface protruding towards the image source 110, the first light emitting surface O1 can be a plane, the second light incident surface I2 can be a plane, and the second light emitting surface O2 can be a convex surface protruding towards a direction deviating from the image source 110.

However, the shapes and configuration of the lenses in the lens groups of the invention are not limited as that described above, and the shapes and configuration of the lenses in the lens groups can be suitably designed according to an actual requirement. For example, in another embodiment, the first light incident surface I1 can be a plane, the first light emitting surface O1 can be a convex surface protruding towards the direction deviating from the image source 110, the second light incident surface I2 can be a plane, and the second light emitting surface O2 can be a convex surface protruding towards the direction deviating from the image source 110. In still another embodiment, the first light incident surface I1 can be a plane, the first light emitting surface O1 can be a convex surface protruding towards the direction deviating from the image source 110, the second light incident surface I2 can be a convex surface protruding towards the image source 110, and the second light emitting surface O2 can be a plane. In yet another embodiment, the first light incident surface I1 can be a convex surface protruding towards the image source 110, the first light emitting surface O1 can be a plane, the second light incident surface I2 can be a convex surface protruding towards the image source 110, and the second light emitting surface O2 can be a plane.

Referring to FIG. 1, FIG. 2, FIG. 3 and FIG. 4, each of the lens groups 122 may further include a condensing lens 122c. The condensing lens 122c is disposed on the transmission path of the corresponding sub image beam L1. The second lens 122b is located between the first lens 122a and the condensing lens 122c. The condensing lens 122c may converge the corresponding sub image beam L1 to image the sub image beam L1 on the screen S. In the embodiment, the condensing lens 122c can be a spherical lens. However, the invention is not limited thereto, and in other embodiments, the condensing lens 122c can also be an aspherical lens, and the aspherical lens may decrease an aberration degree of the sub image beam L1 to improve imaging quality of the sub image beam L1 on the screen S.

In the embodiment, the lens groups 122 can be formed integrally. In other words, the first lenses 122a, the second lenses 122b and the condensing lenses 122c of the lens groups 122 can be fabricated together. However, the invention is not limited thereto, and in other embodiments, the condensing lens can be separately fabricated, and does not belong to the lens groups 122. In detail, in other embodiments, the condensing lens (not shown) can be disposed on the transmission path of a plurality of the sub image beams L1, and the lens group 122 is located between the image source 110 and the condensing lens. The condensing lens may have an aspherical surface. The aspherical surface can be formed by connecting a plurality of spherical surfaces, and sphere centers of the spherical surfaces can be arranged along a direction perpendicular to the arranging direction y. The function of the condensing lens separately fabricated with the lens group 122 is equivalent to that of the condensing lenses 122c, and details thereof are not repeated.

Figure 5:
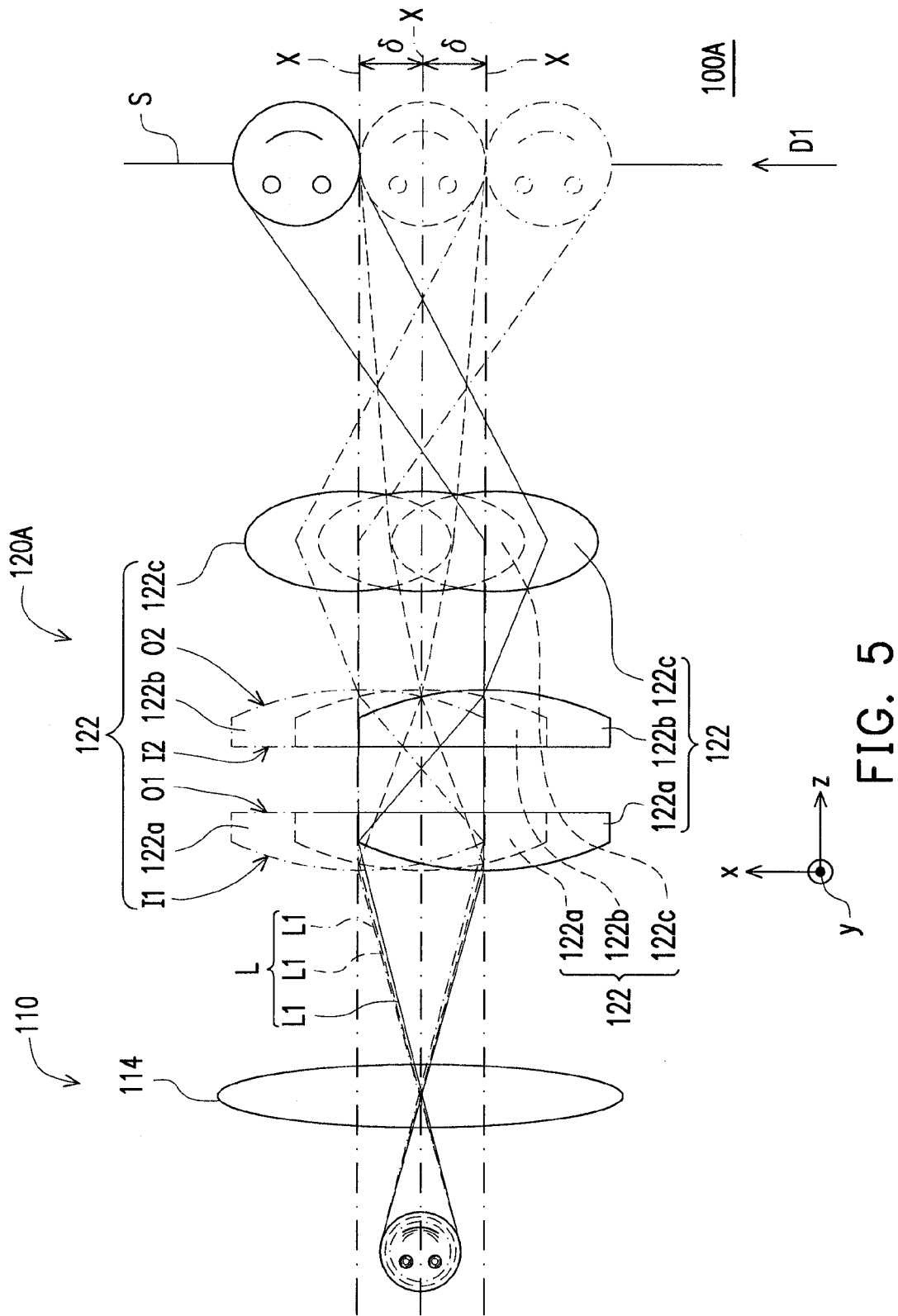
FIG. 5 is a schematic diagram of a projection apparatus according to another embodiment of the invention.
Figure 6:
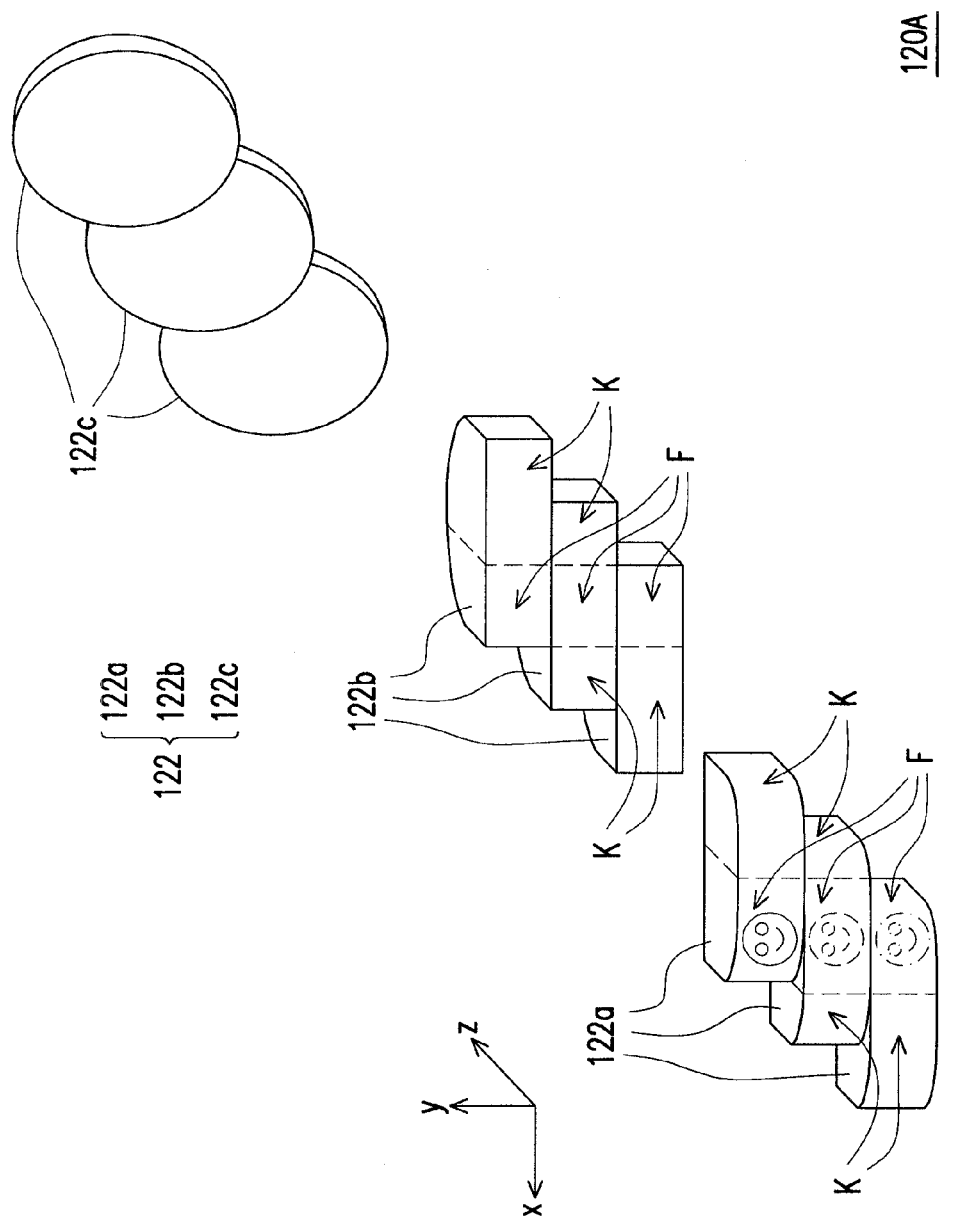
FIG. 6 illustrates an image rearranging lens of FIG. 5.

The image rearranging lens 120 of FIG. 1 includes two lens groups 122. However, the number of the lens groups 122 is not limited by the invention, and a designer can determine the number of the lens groups 122 according to a number of the sub images to be rearranged. FIG. 5 and FIG. 6 are taken as an example for descriptions. FIG. 5 is a schematic diagram of a projection apparatus according to another embodiment of the invention. The projection apparatus 100A of FIG. 5 is similar to the projection apparatus 100 of FIG. 1, so that the same elements are denoted by the same referential numbers, and a difference there between lies in the number of the lens groups 122, and the same parts thereof are not repeated. FIG. 6 illustrates an image rearranging lens of FIG. 5. Referring to FIG. 5 and FIG. 6, for example, when three sub image beams L1 are to be rearranged, the image rearranging lens 120A includes at least three lens groups 122. Similarly, the three sub image beams L arranged long the arranging direction y can be rearranged on the screen S through the three lens groups 122 with the optical axes X not aligned to each other along the arranging direction y.

In summary, the image rearranging lens and the projection apparatus of the invention may guide the sub image beams to different directions based on a design that the optical axes of the lens groups are not aligned along the arranging direction of the sub images, so as to rearrange the sub images.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image rearranging lens for rearranging a first image provided by an image source, the first image comprising a plurality of sub images arranged along a first direction, the image rearranging lens comprising:
   a plurality of lens groups arranged along the first direction, each of the lens groups being suitable for propagating one of the sub images along a propagating direction, the lens groups being suitable for rearranging the first image comprising the sub images arranged along the first direction into a second image comprising the sub images arranged along a second direction, the second direction being different from the first direction and different from the propagating direction, and an offset existing between two adjacent lens groups along the second direction.

2. The image rearranging lens as claimed in claim 1, wherein each of the lens groups comprises:
   a first lens disposed on a transmission path of a corresponding sub image beam; and
   a second lens disposed on the transmission path of the corresponding sub image beam, and the first lens being located between the image source and the second lens.

3. The image rearranging lens as claimed in claim 2, wherein the first lens has a first light incident surface and a first light emitting surface, and the second lens has a second light incident surface and a second light emitting surface, wherein the first light incident surface is a convex surface protruding towards the image source, the first light emitting surface is a plane, the second light incident surface is a plane, and the second light emitting surface is a convex surface protruding towards a direction deviating from the image source.

4. The image rearranging lens as claimed in claim 2, wherein the first lens has a first light incident surface and a first light emitting surface, and the second lens has a second light incident surface and a second light emitting surface, wherein the first light incident surface is a plane, the first light emitting surface is a convex surface protruding towards a direction deviating from the image source, the second light incident surface is a plane, and the second light emitting surface is a convex surface protruding towards the direction deviating from the image source.

5. The image rearranging lens as claimed in claim 2, wherein the first lens has a first light incident surface and a first light emitting surface, and the second lens has a second light incident surface and a second light emitting surface, wherein the first light incident surface is a plane, the first light emitting surface is a convex surface protruding towards a direction deviating from the image source, the second light incident surface is a convex surface protruding towards the image source, and the second light emitting surface is a plane.

6. The image rearranging lens as claimed in claim 2, wherein the first lens has a first light incident surface and a first light emitting surface, and the second lens has a second light incident surface and a second light emitting surface, the first light incident surface is a convex surface protruding towards the image source, the first light emergent surface is a plane, the second light incident surface is a convex surface protruding towards the image source, and the second light emitting surface is a plane.

7. The image rearranging lens as claimed in claim 2, wherein each of the lens groups further comprises:
   a condensing lens disposed on the transmission path of the corresponding sub image beam, and the second lens is located between the first lens and the condensing lens.

8. The image rearranging lens as claimed in claim 1, further comprising:
   a condensing lens disposed on a transmission path of sub image beams, and the lens groups being located between the image source and the condensing lens.

9. The image rearranging lens as claimed in claim 1, wherein each of the lens groups has an imaging portion and a shifting portion connected to the imaging portion, wherein the corresponding sub image is imaged on the imaging portion of the lens group.

10. A projection apparatus, comprising:
    an image source for providing a first image comprising a plurality of sub images arranged along a first direction; and
    an image rearranging lens as recited in claim 1, the image rearranging lens being disposed on a transmission path of the sub image beams.

11. The projection apparatus as claimed in claim 10, wherein each of the lens groups comprises:
    a first lens disposed on a transmission path of a corresponding sub image beam; and
    a second lens disposed on the transmission path of the corresponding sub image beam, and the first lens being located between the image source and the second lens.

12. The projection apparatus as claimed in claim 11, wherein the first lens has a first light incident surface and a first light emitting surface, and the second lens has a second light incident surface and a second light emitting surface, wherein the first light incident surface is a convex surface protruding towards the image source, the first light emitting surface is a plane, the second light incident surface is a plane, and the second light emitting surface is a convex surface protruding towards a direction deviating from the image source.

13. The projection apparatus as claimed in claim 11, wherein the first lens has a first light incident surface and a first light emitting surface, and the second lens has a second light incident surface and a second light emitting surface, wherein the first light incident surface is a plane, the first light emergent surface is a convex surface protruding towards a direction deviating from the image source, the second light incident surface is a plane, and the second light emitting surface is a convex surface protruding towards the direction deviating from the image source.

14. The projection apparatus as claimed in claim 11, wherein the first lens has a first light incident surface and a first light emitting surface, and the second lens has a second light incident surface and a second light emitting surface, wherein the first light incident surface is a plane, the first light emitting surface is a convex surface protruding towards a direction deviating from the image source, the second light incident surface is a convex surface protruding towards the image source, and the second light emitting surface is a plane.

15. The projection apparatus as claimed in claim 11, wherein the first lens has a first light incident surface and a first light emitting surface, and the second lens has a second light incident surface and a second light emitting surface, wherein the first light incident surface is a convex surface protruding towards the image source, the first light emitting surface is a plane, the second light incident surface is a convex surface protruding towards the image source, and the second light emitting surface is a plane.

16. The projection apparatus as claimed in claim 11, wherein each of the lens groups further comprises:
   a condensing lens disposed on the transmission path of the corresponding sub image beam, and the second lens is located between the first lens and the condensing lens.

17. The projection apparatus as claimed in claim 10, further comprising:
   a condensing lens disposed on a transmission path of sub image beams, and the lens groups being located between the image source and the condensing lens.

18. The projection apparatus as claimed in claim 10, wherein each of the lens groups has an imaging portion and a shifting portion connected to the imaging portion, wherein the corresponding sub image is imaged on the imaging portion of the lens group.

19. The projection apparatus as claimed in claim 10, wherein the image source comprises a projection lens, wherein the image rearranging lens is disposed between the projection lens and a screen.

20. An image rearranging lens for rearranging a plurality of sub images provided by an image source and arranged along an arranging direction, the image rearranging lens comprising:
   a plurality of lens groups arranged along the arranging direction, wherein each of the sub images is imaged on a corresponding lens group, and optical axes of the lens groups are not aligned to each other along the arranging direction, and the optical axis of each of the lens groups and the optical axis of the neighboring lens groups have an offset along a direction perpendicular to the arranging direction, wherein each of the lens groups has an imaging portion and a shifting portion connected to the imaging portion, wherein the corresponding sub image is imaged on the imaging portion of the lens group.

\* \* \* \* \*